UNITED STATES PATENT OFFICE.

HERMANN KRAFT AND GADIENT ENGI, OF BASEL, SWITZERLAND, ASSIGNORS TO THE FIRM OF SOCIETY OF CHEMICAL INDUSTRY IN BASLE, OF BASEL, SWITZERLAND.

VIOLET VAT DYE AND PROCESS OF MAKING SAME.

No. 899,994.   Specification of Letters Patent.   Patented Sept. 29, 1908.

Application filed April 22, 1908. Serial No. 428,690.

*To all whom it may concern:*

Be it known that we, HERMANN KRAFT, doctor of philosophy and chemist, a subject of the Emperor of Austria-Hungary, and resident of Basel, Switzerland, and GADIENT ENGI, doctor of philosophy and chemist, a citizen of the Swiss Republic, and resident of Basel, Switzerland, have invented new and useful Violet Vat Dyestuffs and a Process of Making Same, of which the following is a full, clear, and exact specification.

We have found, that valuable violet vat-dyestuffs can be obtained by condensing the alphaärylids of 2:3-diketodihydro-1-thionaphthene or of its derivates, corresponding to the general formula

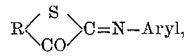

with indoxyls and by subjecting the condensation product thus obtained to a treatment with a halogen or a halogenating agent.

The alphaärylids of 2:3-diketodihydro-1-thionaphthene and of its derivates employed as parent materials can be prepared easily by the action of aromatic nitroso compounds on 3-oxy-1-thionaphthene and its substitution products.

Example. 23.7 parts of the anilid of the 2:3-diketodihydro-1-thionaphthene, melting at 147° C. (prepared by condensing nitrosobenzene with 3-oxy-1-thionaphthene in an alcoholic solution), 17.5 parts of acetindoxyl or 13.5 parts of indoxyl, 10 parts of sodium carbonate and 100 to 120 parts alcohol, are boiled together, on a water bath, for 3 hours. The liquid assumes a brownish-yellow coloration and the condensation product precipitates gradually. This latter is separated by filtration, washed with water and thus obtained as small, dark violet, felted crystals of a copper reflex. In order to transform the product in a brominated dyestuff, 14 parts of this condensation product are suspended in 100 to 140 parts of nitrobenzene and to this suspension 27 parts of bromin are added and heated in the course of about 1½ hours in an oil bath to 220–230° C. After a further heating for 1 hour, the mass is cooled down and filtered and the dyestuff is washed with alcohol and dried. It constitutes a dark violet powder of a copper luster, which dissolves in concentrated sulfuric acid with a blue coloration turning to a greenish blue on heating. In hot alcohol it is difficultly soluble with a blue-violet coloration but it is more easily soluble in hot nitrobenzene with a red-violet coloration. By its treatment with alkaline reducing agents it yields a brownish yellow vat dyeing cotton splendid violet-blue tints becoming more reddish on soaping. The dyeings are fast to washing, light and chlorin.

In an analogous manner are prepared halogenated dyestuffs of similar properties when the condensation products of indoxyl or its derivatives with other arylids of 2:3-diketodihydro-1-thionaphthene or of its substitution products are employed.

What we claim is:

1. The herein described process for the manufacture of violet vat-dyestuffs, which consists in condensing first an indoxyl-compound with an alpha-arylid of a 2:3-diketodihydro-thionaphthene-compound and treating then the so obtained condensation product with halogenating agents.

2. The herein described process for the manufacture of violet vat-dyestuffs, which consists in treating the products obtainable by the condensation of indoxyl-compounds with 2:3-diketodihydro-1-thionaphthenearylids, with halogenating agents.

3. The herein described process for the manufacture of a violet vat-dyestuff, which consists in first condensing indoxyl with the alpha-anilid of 2:3-diketodihydro-1-thionaphthene and treating then the so obtained product with bromin.

4. As new products, the halogenated vat-dyestuffs obtainable by treating the condensation products of indoxyl-compounds and 2:3-diketodihydrothionaphthene-arylids with halogenating agents, constituting in dry state violet powders, dissolving in concentrated sulfuric acid with a blue to greenish blue coloration, soluble in hot nitrobenzene with a violet coloration and yielding, when treated with alkaline reducing agents, a brownish yellow vat dyeing cotton violet to violet-blue tints fast to washing, light and chlorin.

5. As a new product, the halogenated vat-dyestuff, obtainable by treating the condensation product of indoxyl and 2:3-diketodihydro-1-thionaphthene-alphaänilid with bromin, constituting in dry state a dark violet powder of copper luster, dissolving in concentrated sulfuric acid with a pure blue color, difficultly soluble in hot alcohol with a bluish-violet coloration, more easily soluble in hot nitrobenzene with a red-violet coloration and yielding, when treated with alkaline reducing agents, a brownish-yellow vat dyeing cotton violet-blue tints fast to washing, light and chlorin.

In witness whereof we have hereunto signed our names this ninth day of April 1908, in the presence of two subscribing witnesses.

HERMANN KRAFT.
GADIENT ENGI.

Witnesses:
GEO. GIFFORD,
ARNOLD ZUBER.